UNITED STATES PATENT OFFICE.

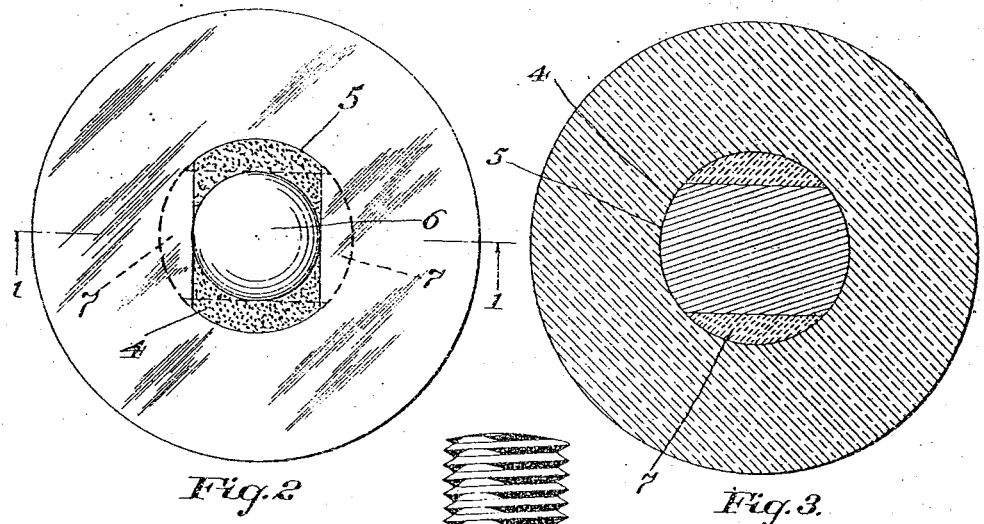
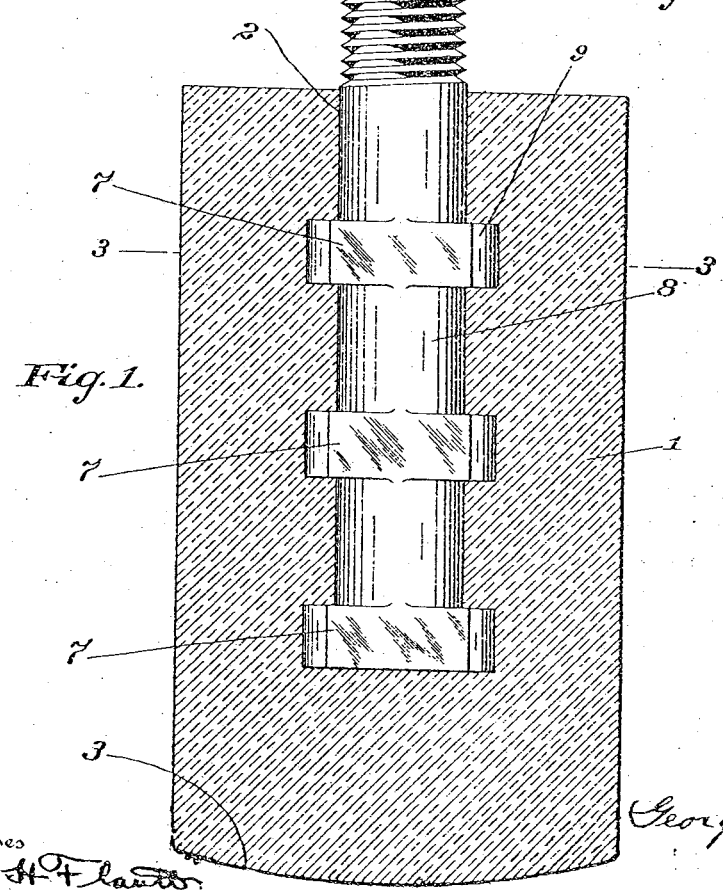

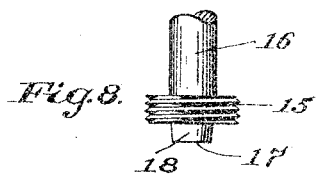
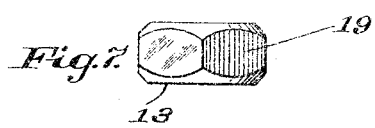
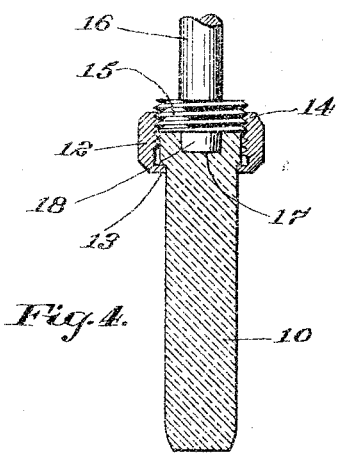
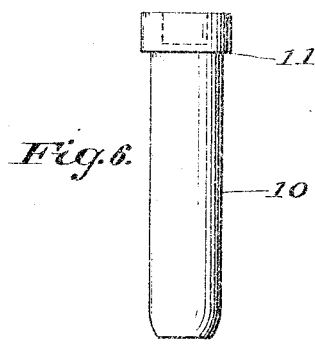
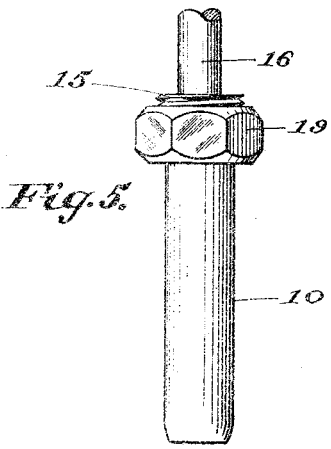

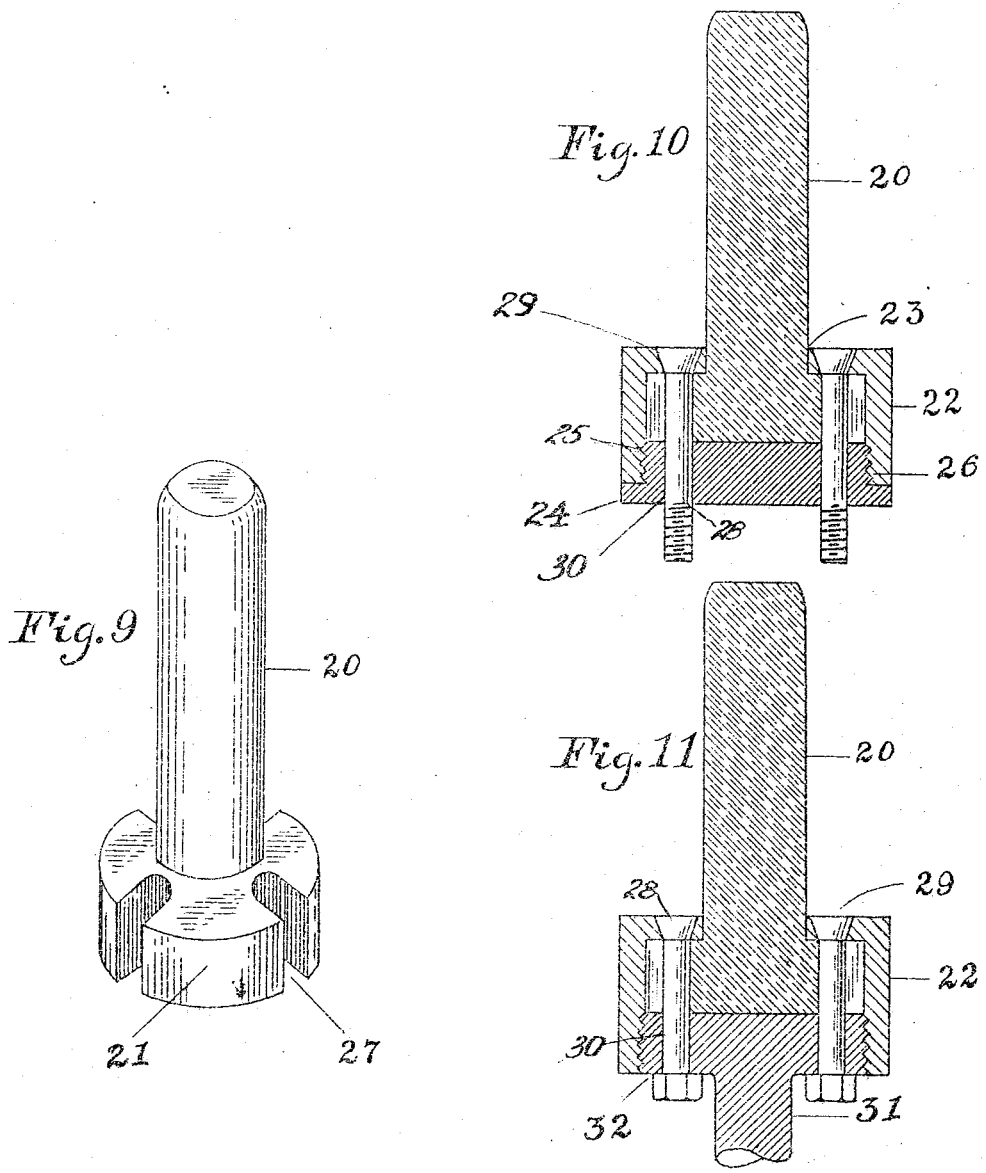

GEORGE H. WRIGHTSON, JR., OF BUTTE, MONTANA.

PUMP-PISTON.

1,195,546.  Specification of Letters Patent.  Patented Aug. 22, 1916.

Application filed June 4, 1915. Serial No. 32,200.

*To all whom it may concern:*

Be it known that I, GEORGE H. WRIGHTSON, Jr., a citizen of the United States of America, residing in the city of Butte, county of Silverbow, State of Montana, have invented certain new and useful Improvements in Pump-Pistons, of which the following is a specification.

The difficulties encountered in providing suitable pumping apparatus for use in mines, chemical works and the like where water containing a small percentage of acid, as sulfuric acid, or the salts of sulfuric acid which under certain conditions will form an acid, or in handling solutions of acid in connection with various industrial enterprises, are comparatively well-known. The U. S. Patent No. 1,133,778, issued to this applicant under date of March 30th, 1915, discloses a pump piston of glass or porcelain, having a central longitudinal opening through which a rod forming an extension of the piston rod is passed, but this structure, though an improvement over the prior art, leaves a certain amount of metal exposed to the action of the chemicals contained in the fluid being pumped. Previous to the issue of the patent, attempts were made to provide a non-corrosive piston by casting a vitreous piston about an iron core. This could not be successful on account of the different co-efficients of expansion of the glass and metal.

The object of the present invention is to provide a non-corrosive pump piston in which there are no metal parts exposed to the liquid being pumped, the exposed parts being of glass or porcelain, and having the connection between the glass or porcelain and the piston rod made without the necessity for casting the vitreous material about or in contact with the metal. With this end in view, I have evolved a piston which is solid at the forward end so that an uninterrupted surface of vitreous material is presented to the liquid, but which at the rear, is provided with means for establishing an interlocking engagement with the piston rod, so arranged that both parts may be formed separately and then assembled to form a rigid structure, obviating the necessity for casting the glass around the metal or vice versa.

In the accompanying drawings, I have illustrated a piston and means for connecting the piston rod, several forms being shown, the interlocking elements of the piston being in one instance internally and in the other externally placed.

Figure 1 is a central longitudinal section of one form of the invention; Fig. 2 is an end view looking from the rear or crank end of the piston; Fig. 3 is a section on the line 3, 3 of Fig. 1; Fig. 4 is a central longitudinal section of a piston embodying the invention in a slightly different form, the interlocking connection being external in this instance, instead of internal as in the previous figures; Fig. 5 is a view of the piston and piston rod; Fig. 6 is a view of the vitreous portion of the piston; Figs. 7 and 8 are detail views of the metallic connecting members; Fig. 9 is a perspective view of the porcelain or vitreous member in a slightly different form of the invention; Fig. 10 is a vertical central section showing the piston assembled with projecting bolts for the attachment of the piston rod; and Fig. 11 shows a similar construction with the piston rod made integral, a portion of the rod being shown.

Referring to the drawings by numerals, I have shown in Figs. 1, 2 and 3, a piston composed of a cylindrical block 1 of vitreous material, as glass, porcelain, or the like, apertured from the rear at 2 and solid at the forward end 3 which, as shown, is shaped to conform to the cylinder head of the pump. The opening 2 is formed in the cylinder as cast. As shown, it is a longitudinal central slot 4, the ends 5 of the slot being shown as formed of an arc concentric with the axis 6, and at intervals, the slot 4 is recessed as at 7, the recesses being preferably arcuate and concentric with the axis 6 and having their walls continuous with and of the same radius as the arcuate walls 5 at the end of the slot 4. The aperture 2 consisting of the slot 4 and the chambers 7, is formed to receive and interlock with a metallic member which may be the end of the piston rod or a core to which the piston rod is attached. This is shown at 8 in the form of a rod or bar having transverse shoulders 9 at intervals equal to those which separate the chambers 7. These shoulders are in cross-section, as shown in Fig. 3, similar to and slightly less than that of the slot 4 and of a length, *i. e.*, the dimension taken at right angles to the plane of this cross-section, slightly less than that of the chambers 7, so that to seat the core and establish the interlocking engagement referred to, it is only necessary to insert the rod or bar 8 in the slot 4 as far as it will go, or until the shoulders 9 are opposite the chambers 7, and rotate it so that the ends of the shoulders occupy the chambers. In this position, the bar is locked and cannot be removed. To make this engagement permanent, a suitable cement is introduced into the aperture 2 before the rod is inserted. This cement, by the insertion and rotation of the rod, is squeezed into the ends of the slots 4 and fills the excess space in the aperture completely so that when it sets, the engagement is rigid and for all practical purposes permanent, though it may be removed by dissolving or otherwise softening the cement.

A second modification of my invention is shown in Figs. 4 to 8. In this a solid cylindrical piston 10 of vitreous material is used. The cylindrical member has, at the rear end, a shoulder 11, which is engaged by a metallic collar 12 having an internal shoulder 13 to coöperate with the shoulder 11 forming an external interlocking engagement between the metal and porcelain. The collar 12, in the form of the invention shown, is internally threaded at 14 and this thread is engaged by a corresponding threaded end 15 on the piston rod, shown fragmentarily at 16. For the purpose of centering the parts and establishing a more rigid engagement, the cylinder has a central pocket at 17 which is engaged by a projecting stud 18 on the rod 16. A wrench or similar means may be used for rotating the collar 12 relatively to the piston rod and cylinder and the external surface of the collar is shown as formed with flat surfaces 19 which may be arranged in the form of a hexagon or otherwise, or any kind of an engagement, as a spanner or similar device, may be used. In this way, the parts may be tightened to any desired degree and assembled in an absolutely rigid relation.

In Figs. 9 to 11 I have shown a slightly different form of the invention in which there is a porcelain or vitreous member 20 having a flange or head 21 to be seated in a socket 22 apertured at 23 to permit the plunger proper 20 to project. The flange or head 21 is held in position in the socket by means of a plug 24 threaded at 25 to engage an internal thread 26 in the socket. The flange 21 has notches in its periphery to receive bolts 28 which pass through suitable bolt holes 29 in the bottom of the socket, and 30 in the plug. The bolts 28 are adapted to engage anything in the nature of a connecting rod which it may be desired to attach, or the connecting rod 31 may be made integral with the plug 32 as shown in Fig. 11. In this instance, there is a porcelain piston 20 having an interlocking engagement with a socket 22 and plug 24. In addition to this interlocking engagement, we have bolts 28 to hold the threaded portions in their positive relation and also capable of being utilized to attach the connecting rod if desired.

I have thus shown three forms of my invention in which a rigid connection is made between a piston rod and a vitreous piston body whereby the parts are rigidly connected without involving the necessity for casting them integral, and at the same time, all the metallic parts are protected so that the entire piston surface which is presented to the liquid, is of non-corrosive material.

I have thus described my invention specifically and in detail in order that its nature and operation may be fully understood; however, the specific terms herein are used descriptively rather than in their limiting sense and the scope of the invention is defined in the claims:

1. A pump plunger or piston consisting of a cylindrical block of vitreous material and metallic means for connecting the block to the moving parts of the pump, the metal portion and the vitreous portion being separable members and having an interlocking engagement whereby the metallic parts are covered by the vitreous material except at the rear.

2. A pump piston composed of a cylindrical block of vitreous material having shoulders and metallic means for connecting the block to the moving parts of the pump, the metal members also having shoulders to engage those of the block and form an interlocking connection between the metal and the vitreous material, the cylindrical block being cast separately from the metal parts and having its forward and lateral surfaces, so far as they are exposed to the liquid pumped, continuous and the metal portions exposed at the rear of the piston only, so that they are not in contact with the liquid in the normal operation of the pump.

3. A pump plunger or piston consisting of a cylindrical block of vitreous material and mechanical means for connecting the block to the moving parts of the pump, the block having a slot with side chambers, and the metallic connections consisting of a rod of a diameter to enter the slot, the rod having shoulders adapted to pass through the slot, so that when the rod is turned through an angle of 90°, the shoulders enter the chambers in the slot and form a rigid connection.

4. A pump plunger or piston consisting of a cylindrical block of vitreous material and mechanical means for connecting the block to the moving parts of the pump, the block having a slot with side chambers, the slot being longitudinal and being open at the rear end of the piston only, metallic connections consisting of a rod of a diameter to enter the slot, the rod having shoulders adapted to pass through the slot, so that when the rod is turned through an angle of 90°, the shoulders enter the chambers in the slot and form a rigid connection.

5. A pump plunger or piston consisting of a cylindrical block of vitreous material and mechanical means for connecting the block to the moving parts of the pump, the block having a slot with side chambers, the slot being longitudinal and being open at the rear end of the piston only, metallic connections consisting of a rod of a diameter to enter the slot, the rod having shoulders adapted to pass through the slot, so that when the rod is turned through an angle of 90°, the shoulders enter the chambers in the slot and form a rigid connection, the excess space in the aperture being filled with cement.

Signed by me at Butte, Montana, this 18th day of May, 1915.

GEORGE H. WRIGHTSON, Jr.

Witnesses:
 ALBERT A. CALLOW,
 JOHN N. HASKING.